United States Patent [19]

Haluska

[11] Patent Number: 5,638,519

[45] Date of Patent: Jun. 10, 1997

[54] ELECTRONIC METHOD AND SYSTEM FOR CONTROLLING AND TRACKING INFORMATION RELATED TO BUSINESS TRANSACTIONS

[76] Inventor: John E. Haluska, 8269 Kimbrough Woods Cove, Germantown, Tenn. 38139

[21] Appl. No.: 246,588

[22] Filed: May 20, 1994

[51] Int. Cl.$^6$ ................................................ G06F 13/00
[52] U.S. Cl. ............................................ 395/228; 395/201
[58] Field of Search ............................ 364/401, 406, 364/408; 395/201, 228

[56] References Cited

U.S. PATENT DOCUMENTS

| | | |
|---|---|---|
| 2,995,729 | 8/1961 | Steele . |
| 3,631,993 | 1/1972 | Young . |
| 3,909,604 | 9/1975 | Monna . |
| 4,340,810 | 7/1982 | Glass . |
| 4,459,663 | 7/1984 | Dye . |
| 4,588,881 | 5/1986 | Pejas, et al. . |
| 4,591,705 | 5/1986 | Toudou . |
| 4,621,325 | 11/1986 | Naftzger et al. . |
| 4,636,950 | 1/1987 | Caswell et al. . |
| 4,672,553 | 6/1987 | Goldberg . |
| 4,737,910 | 4/1988 | Kimbrow . |
| 4,783,740 | 11/1988 | Ishizawa et al. . |
| 4,787,037 | 11/1988 | Ootsuka . |
| 4,799,156 | 1/1989 | Shavit et al. ............ 364/401 |
| 4,832,204 | 5/1989 | Handy . |
| 4,866,628 | 9/1989 | Natarjan . |
| 4,887,208 | 12/1989 | Schneider et al. . |
| 4,964,043 | 10/1990 | Galvin . |
| 5,038,283 | 8/1991 | Caveney . |
| 5,168,445 | 12/1992 | Kawashima et al. . |
| 5,222,018 | 6/1993 | Sharpe et al. ............ 364/406 |
| 5,231,273 | 7/1993 | Caswell et al. . |

FOREIGN PATENT DOCUMENTS

| | | |
|---|---|---|
| 1459526 | 11/1966 | France . |
| 156660 | 3/1922 | United Kingdom . |
| 1351010 | 4/1974 | United Kingdom . |
| 2175566 | 12/1986 | United Kingdom . |

Primary Examiner—Gail O. Hayes
Assistant Examiner—Steven Yount
Attorney, Agent, or Firm—Michael L. Hoelter; Salvatore J. Abbruzzese

[57] ABSTRACT

A computer-implemented method for automatically controlling and tracking information related to business transactions occurring between a provider and a receiver of goods. The business transactions are tracked via an electronic system that includes a provider computer, at least one receiver computer and a business controller in electrical communication with the provider computer and the at least one receiver computer. The method includes an initiation step, step of receiving and retrieving the electronic information by the business controller and processing the electronic information to generate updated electronic information. The information is stored and rendered mutually accessible to the provider computer and the at least one receiver computer substantially simultaneously.

6 Claims, 6 Drawing Sheets

ELECTRONIC METHOD AND SYSTEM FOR CONTROLLING AND TRACKING INFORMATION RELATED TO BUSINESS TRANSACTIONS

FIELD OF THE INVENTION

The present invention relates to business transactions between supplier and customer, and more particularly relates to an electronic method of tracking and controlling information relating to business transactions, the sharing of the business transaction information and system for implementing same.

BACKGROUND OF THE INVENTION

Vendor managed inventory (VMI), as it is commonly called, is a business method which relates to vendor (referred to interchangeably as "manufacturer", "supplier", "provider" or "seller"), and customer (referred to interchangeably as "receiver", "buyer" or "distributor") interaction in an effort to minimize the customer's share of the distribution cost associated with distributing a supplier's goods. Vendors that are able to reduce the customer's cost incurred with the purchase and distribution of the vendors' goods provide an added incentive for the customer to stock and sell more goods, if not full lines of the vendor's products.

A key feature in any conventional system integrating information relating to business transactions between a supplier and its customers is the use of a computer to receive and delegate inventory and invoice information, provided from either the supplier or the customer, and to generate an automatic electronic purchase order therefrom. Through various forms of supplier (manufacturer) and customer (receiver) interaction pursuant to the computer generated purchase order the process for the distribution of goods may be streamlined.

For example, U.S. Pat. No. 5,168,445 to Kawashima et al. discloses an automated ordering system for use in a retail shop that is adapted for automatically ordering frequently sold goods. The Kawashima system enables a stock caretaker, such as a shop manager, to understand and utilize factors of changing demand for individual goods in order to assist in the determination of an ideal order amount. The system then electronically determines and uses the ideal order amount as well as other electronically stored information, e.g., the status of the particular stock and factors affecting the stock's storage and use, to electronically determine an order amount and order the goods to replenish inventory.

The Kawashima system electronically generates the ideal order amount by correlating both point of sale data derived from the actual selling results and stock data relating to the actual stocked goods. The correlated data is then massaged according to information input by a user. Such information includes factors indicative of changing sales volume, events in the market area or bargain sale items in the shop, as well as more collateral information such as the weather, geographic place, selling status of other shops, and tradenames, to name a few. Calculations are then performed electronically on the data and order slips are automatically generated therefrom.

Although some parts of the Kawashima system are automatic, i.e., the manipulation of data and generation of the order slip, the system is nevertheless conventional in that it relies heavily on the user's contribution and input of data. The Kawashima system is not a fully automated electronic system. That is, once an electronic order is generated for a particular item or manufactured good, the order still must be communicated in some way by and to personnel, as with most conventional systems. No electronic means are provided for tracking and sharing of information relating to any business transaction taking place between a supplier and its customer.

In addition to automatically generating purchase orders, vendor managed inventory systems have attempted to provide users with the ability to streamline the shipping/receiving process. For example, U.S. Pat. No. 5,038,283 to Caveny discloses an electronic based shipping method for facilitating efficient distribution of goods between manufacturer and distributor. The Caveny shipping method requires the labeling of individual items for shipment with identification indicia, labeling a shipping container with container identification indicia and recording in a shipping location computer database the container and identification indicia and including a list of the items shipped in the container. A container packing record is electronically generated according thereto.

The Caveny shipping method electronically transmits the container packing record to a database that is accessible by a shipping destination computer at the shipping destination. There, a customer order list of identification indicia identifying items necessary to fill customer orders, and a list of indicia of containers received at the shipping destination are recorded in a data base. The shipping destination computer includes a program to compare the identification indicia of the items recorded in the container packing record of a received container with the identification indicia of the items in the customer order. The received container may thereby be directed to either general inventory or to an area for further shipping if need be bypassing the need to handle and check each item of the goods.

While the Caveny shipping method attempts to reduce some of the time and effort associated with the receipt and restocking (handling) of incoming shipments including the prompt filling of outstanding orders, the method still requires significant checking and handling in the form of routing incoming orders at the receiving area of the distributor location. In other words, the Caveny shipping method is concerned with accounting of goods shipped per order. The Caveny shipping method does not provide a way of electronically streamlining the communication process associated with the control and distribution of goods, including tracking business transactions such as auditing, price administration and adjustments.

It is therefore an object of the present invention to provide an electronic method for automatically tracking and controlling information related to a detailed level of business activities and sharing information related thereto between a supplier and receiver of goods and system for implementing the same.

It is another object of the present invention to provide a method of electronically processing business transaction information related to damaged materials, shortages or overages identified by a receiver of goods and an computer-based system implementing the same.

It is still another object of the present invention to provide an electronic business interface between a supplier and receiver of goods to enable the immediate sharing and auditing of all information related to all associated business activities.

It is yet another object of the present invention to provide a method of significantly lowering the overhead cost associated with certain business transactions carried out between a supplier and receiver of goods and an electronic system for implementing the same.

It is still yet another object of the present invention to provide a method of conducting business between a supplier and receiver of goods in which the number of personnel required to accomplish the same is minimized.

SUMMARY OF THE INVENTION

In accordance with the present invention, a computer-based system and apparatus is provided for automatically controlling information related to business transactions between a provider of goods and receiver of goods, and tracking activities related thereto. In one embodiment, the apparatus includes a provider computer located at a provider location, a receiver computer located at a destination for the provider's goods and a business activity controller apparatus (hereinafter referred to as "business controller") in electrical communication with both the provider computer and the receiver computer for electronically rendering mutually accessible to the provider computer and the receiver computer business activity and transaction information simultaneously, substantially at the time of the transfer of goods.

Preferably, the system includes a business activity transaction generating apparatus (hereinafter referred to as "transaction generator") located at the destination for the provider's goods that is in direct electrical communication with the receiver computer. The transaction generator electronically controls information flow between the business controller and the receiver computer, storing the electronic business information in databases whereby the information may be commonly shared.

A computer-implemented method of the present invention electronically controls information related to business transactions between a provider and receiver of goods and tracks activities related thereto. The electronic information is preferably commonly shared. The electronic system utilized by the method may include a provider computer, a receiver computer and a business controller in electrical communication with the provider computer.

The computer-implemented business method includes the steps of initiating the computer-based method, electronically receiving business activity transaction information at the business controller, retrieving the stored electronic information, and processing the received and retrieved electronic information, storing the processing results and generating an updated electronic invoice. The updated electronic invoice may then be provided to the electronic communication means where it is accessible to the provider computer and the receiver computer substantially simultaneously.

The computer-based system for automatically controlling information related to business transactions of this invention provides the ability for both a provider and receiver of goods to enjoy a shared view of the status of a goods' shipment and all business activities and information related thereto. This includes a shared view of the status of electronic purchase orders, shipment particulars, the receipt of shipped goods at a receiver location, etc. Also included is a shared view all pricing information related to the goods from the time of ordering to the time of receipt of such goods by the receiver, as well as the immediate recording and sharing of any pricing or quantity discrepancy information (referred to as exception data).

Accordingly, overhead associated with personnel required to track and control shipping particulars, as well as personnel needs for processing certain exception information, e.g., damages, shortages or overages, are removed from the cost of doing business by the present invention. Paper interaction is minimized and replaced by the immediate electronic shared information described above. A business redefinition in this way has the effect of significantly lowering the overall cost of doing business.

These and other objects, features and advantages of this invention will become apparent from the following Detailed Description of the Illustrative Embodiments thereof, which is to be read in conjunction with the accompanying drawings.

DESCRIPTION OF THE PREFERRED EMBODIMENTS

Figure 1:
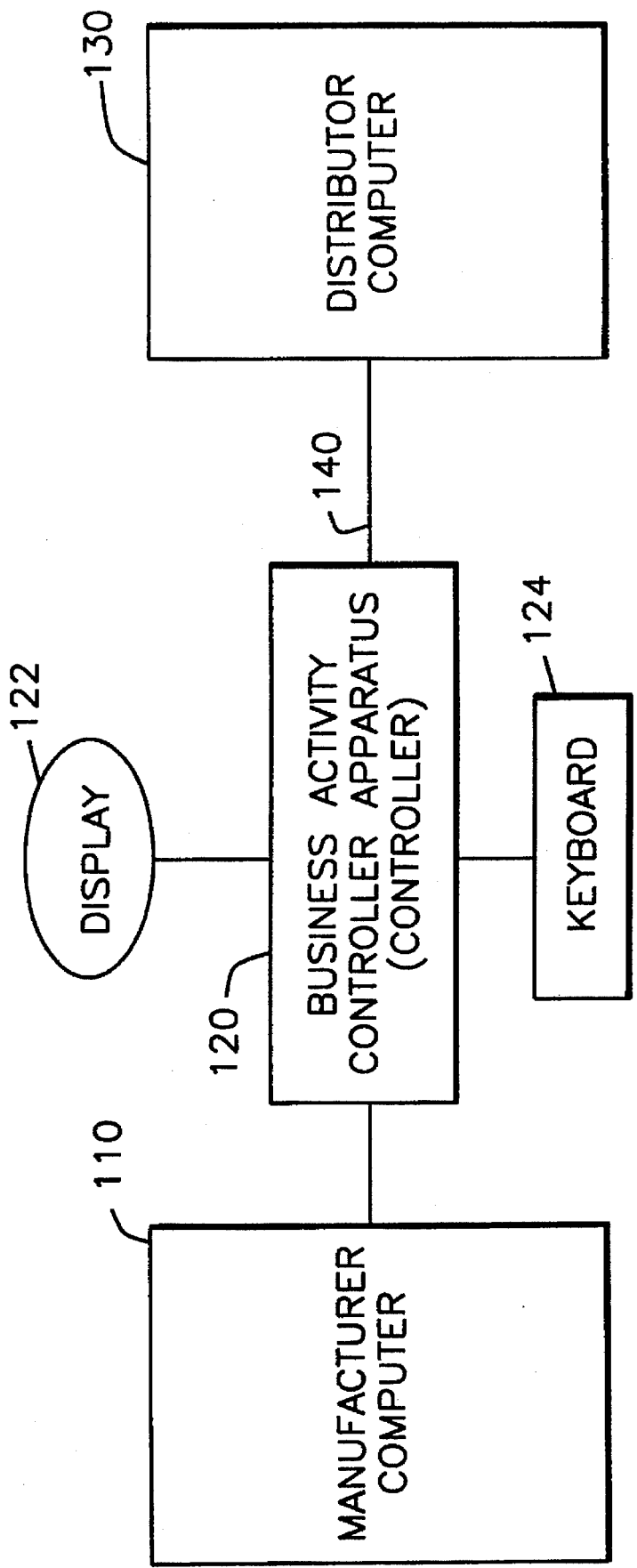
FIG. 1 is a schematic block diagram depicting one embodiment of the electronic system for controlling and tracking information related to business transactions of the present invention.

The present invention relates to the control and tracking of information related to business transactions and the sharing of business transaction information related thereto. One typical example of a business relationship utilizing this invention is that relationship existing between a supplier and a receiver of the supplier's goods. For purposes of this invention, the term "supplier" may be used interchangeably with the terms "manufacturer", "seller", "vendor" and "provider", and the term "receiver" may be used interchangeably with the terms "distributor", "customer" or "buyer". In addition, the phrase "business activities and transaction information" should be interpreted as meaning all and any business transactions and information related thereto. Business activities include electronic commands or signals generated in response to any and all business developments. For example, a business activity such as a "delivery of goods acknowledgment" may embody a data structure that includes an electronic order or invoice number, goods, contact person, date of order, date of shipment, date and place of receipt of goods, etc.

The present invention envisions a scheme whereby conventional control of business transaction information, conventional business methods communication related to the exchange of goods between a manufacturer (provider of goods) and a distributor (receiver of goods) are redefined for modern business needs. The method and system of this invention automatically correlates, adjusts and communicates (shares) a manufacturer's, or other inventory supplier's, and a distributor's, or other inventory receiver's, electronic business activity and business transaction information. While this invention will be described relative to transactions taking place between a manufacturer and the manufacturer's distributor(s), i.e., the manufacturer's receivers, the invention is not limited to such business relationships, but may be utilized by any business entities requiring electronic sharing of business and business related transaction and/or business control information.

In a preferred embodiment, the electronic system for controlling and tracking information relating to business transactions and sharing business information related thereto includes a business activity controller apparatus (referred to interchangeably as a business controller) typically located at a manufacturer or provider location (but not limited thereto), a business activity transaction generating apparatus (referred to interchangeably as a transaction generator), typically located at a distributor or receiver location. The business controller and transaction generator are each in electrical communication with the manufacturer (provider) and the distributor (receiver) computers, respectively, and with each other.

The method and system of this invention provides for immediately updated business transaction control information pursuant to received shipment information, electronic invoice receipt information, price update information, and claim adjustment information (interchangeably referred to as exception data) that is located at the distributor location. Both the transaction generator and the business controller preferably include computers. The computers include a set of instructions or commands defining the method for processing the above-mentioned information. Under certain system applications, the computer programs resident both in the transaction generator and business controller may be identical, with either the transaction generator or controller acting as the control and information sharing center for the system. The business information may be electronically communicated between the receiver computer and transaction generator, between the transaction generator and the business controller, or between the manufacture computer and business controller via varying electronic communication means.

The system provides a method that enables distributor purchase orders (i.e., any orders for inventory or other goods), order acknowledgments, advanced shipping notices, orders in transit, receipt acknowledgments, invoices, price discrepancy claims and quantity disputes, overage/shortage claims, payment acknowledgments, debit/credit adjustments, damaged goods claims, or any information related thereto, to be represented electronically and to be electronically processed. The processed information may then be monitored (or shared) by both the provider and receiver of goods without the traditional use of paper forms and the time lag inherent in human processing.

The invention is particularly adept at electronically and automatically implementing many of the labor intensive traditional business operations. Communication between a manufacturer and the manufacturer's distributors is essential not only for placement and coordination of shipping orders, but for determining real inventory levels in an effort to reduce inventory cost. Further, the method and system of this invention automates the process for determining expected shipping times, delivery dates and timely resolution of claims resulting from discrepancies between an order placed and a order received. System performance includes the relatively immediate electronic posting of pertinent business information at a shared facility referred to herein as a control process point (e.g., transaction generator or business controller) enabling businesses to benefit from a marked increase in communication ability.

FIG. 1 is a schematic block diagram representing a first embodiment of the electronic system for controlling and tracking information related to business transactions 100 of the present invention. Included in the figure is a block 110 which schematically represents a manufacturer's (provider's) network or mainframe computer, a business activity controller apparatus (business controller) preferably located at the manufacturer location in this embodiment 120, a distributor network or receiver mainframe computer 130 linked via link 140 to facilitate communication between the business controller and the receiver computer (or computers).

The activity controller apparatus (business controller) 120 maintains the flow of information in the system. The business controller essentially becomes the system's control process point by accepting and coordinating business activity and tracking information thereby controlling particular business transactions. The business controller 120 operates as a director, translator, processor and distributor of electronic information that may be relevant to both the manufacturer and distributor network computers 130. Theoretically, the control process point may be located at either the manufacturer or receiver location but is not limited thereto. In this embodiment, however, (described in detail hereinbelow) the business controller 120 acts as the control process point and is located at the manufacturer location.

In order to support system communication as above-described, one embodiment of the business controller 120 includes an internal emulation board (not shown), a keyboard 122 for inputting electronic business transaction information at the manufacturer end and a display terminal 124 for disseminating information to users. An internal modem (not shown) within the business controller 120 may be included for use which, when combined with the modems at both ends of the system connected by phone line acts as a replacement for electronic data link 140.

The business controller 120 preferably includes a computer which facilitates operation of the business control and activity information tracking system of this invention. The computer may be any computer known to those skilled in the art capable of receiving and running a set of instructions for carrying out the method of this system. A computer program resident in a memory within the business controller 120 (and transaction generator where the case may apply) defines the set of instructions. Because the system timing and control is software defined, the system may be implemented or modified (i.e., the control process) on any computer having an operating system compatible with the system software. This invention is capable of translating between conventional electronic data interchange (EDI) format and the data format of the receiver network computer 130. For example, a Compaq™ 80486-based machine may be used as the business controller (controller) 120.

Operation of the invention schematically defined by FIG. 1 and described above is as follows. The distributor computer 130 prepares and transmits electronic business transaction activity information (electronic information) to the business controller 120 via electronic data link 140 (referred to as the information collection phase). The electronic information may contain information relating to inventory levels of products in the warehouse, or claim information relating to a receipt of damaged goods, overage or shortage of goods, and most other business transaction information.

Similarly, the manufacturer network computer 110 prepares and transmits electronic business transaction activity information to the business controller 120. Examples of these transactions include Order Acknowledgments, Advanced Shipping Notices, Billing Information, and associated other business transaction.

Generation of the electronic information may be carried out by any known technique, including that shown in the above-mentioned Kawashima patent. The electronic information may be prepared in EDI format for communication between the business controller 120 and the receiver network computer 130, or in any format which is comprehensible or modifiable by the system of the present invention.

Based on information available to the business controller 120 and from the distributor computer 130 (information collection phase), the business controller may prepare business transactions (business transaction phase) to be sent to either the receiver or the manufacturer computer. It is the essence of this invention that each time a business transaction is sent to either manufacturer or distributor, the transactions are directed to both. In other words, all business transactions generated by the business controller 120 are sent to both the manufacturer computer 110 and to the receiver computer 130.

In a more detailed example of this process, the distributor's computer 130 may transmit inventory level activity to a business control computer 120. The information would be processed and an order created by the business controller 120, sending notification to both the manufacturer and receiver computers. Upon processing the order and shipping it to the receiver, the manufacturer computer 110 sends shipping activity information to the business controller which responds by generating an Advanced Shipment Advisory and electronically transmits the Advisory to both the manufacturer and distributor computers.

Upon receipt of the shipment (i.e., the goods), the distributor computer 130 sends activity information to the business controller 120. In response, the business controller sends an information acknowledgement and billing effect transaction information to both the distributor computer 130 and the manufacturer computer 110. If a claim associated with the shipment requires processing, such as a claim for damaged goods, shortage or overage, or any other normal business exception, the information related to the activity is sent from the distributor's computer 130 to the business controller 120, which processes the information and generates an appropriate business transaction, sending the same to both the distributor computer 130 as well as to the manufacturer computer 110.

Another example of the process is the system's response to a price change implemented by the manufacture system, whereby notification of the price change is sent to the business controller 120 by the manufacturer computer 110. Upon receiving the request for price update, the business controller 120 processes the information and creates a business activity to change the price. The business activity (information related to the price change) is then sent by the business controller 120 to both the distributor computer 130 and to the manufacturer computer 110.

Figure 2:
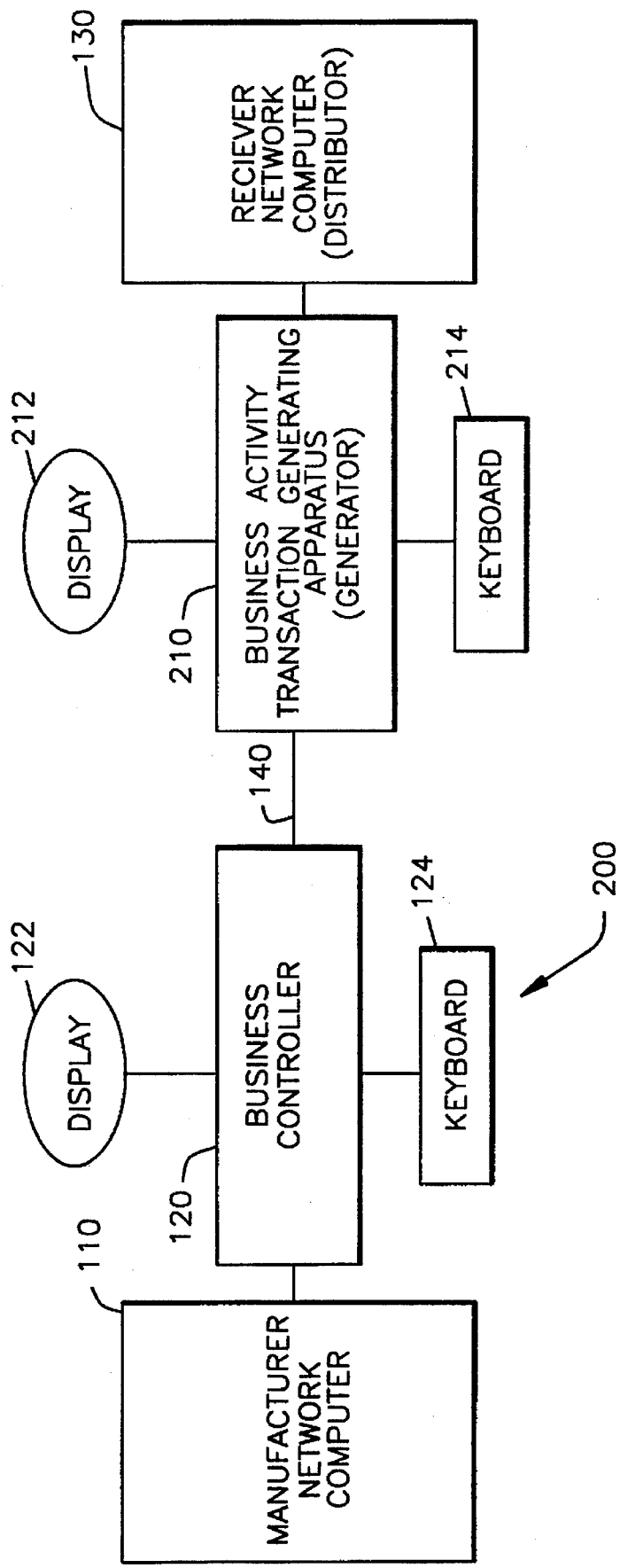
FIG. 2 is a schematic block diagram of the preferred embodiment of the present invention.

A second and preferred embodiment of the electronic method and system of this invention for controlling and tracking information related to business transactions and sharing business information relating thereto is identified as 200 in the schematic block diagram of FIG. 2. The system 200 is similar to the embodiment of FIG. 1 except that a business activity transaction generating apparatus (transaction generator) 210 is included at the distributor location in electrical communication with the receiver network computer 130 and linked via communication link 140 to the business controller 120. The transaction generator 210 acts as the system's control process point in this embodiment, i.e., an electrical interface between the business controller 120 located at the manufacturer location and the receiver network computer 130 via electronic communication link 140. The transaction generator becomes the system's master whereby the business controller is the transaction generator's slave.

Both the business controller 120 and the transaction generator 210 preferably comprise computers downloaded with a copy (each of which may be identical) of object code that defines the system of this invention. While either the business controller 120 or the transaction generator 210 can control system operation, that is, control and track the information related to business transactions and maintain the same for system access, it is the transaction generator 210 that controls the system in this embodiment.

A block of memory resident in and equally accessible to each of the business controller 120 and the transaction generator 210 maintain a number of data files and/or databases. The files may include product information, pricing and quantity information, shipping information, inventory information, receipt and invoice information, inventory model information, performance history information, a structure of personnel that performs various functions of the system etc., as well as the set of computer coded instructions defining the system (i.e., the object code). While the databases that are local to both the business controller 120 and the transaction generator 210 and are not mutually exclusive, they do contain database information which may only be changed (updatable) by the business controller or transaction generator.

Contrasted with the embodiment of FIG. 1, i.e., a business controller located at a manufacturer location with no transaction generator, the manufacturer network computer 110 may directly update certain portions of memory within the business controller. In the present embodiment (FIG. 2), certain portions within memory contained in the transaction generator may be updated directly by the receiver network computer 130 and the business controller if present in the system. Accordingly, different portions of memory, while accessible to both the controller 120 and the generator 210, may have limited updatability.

Figure 3:
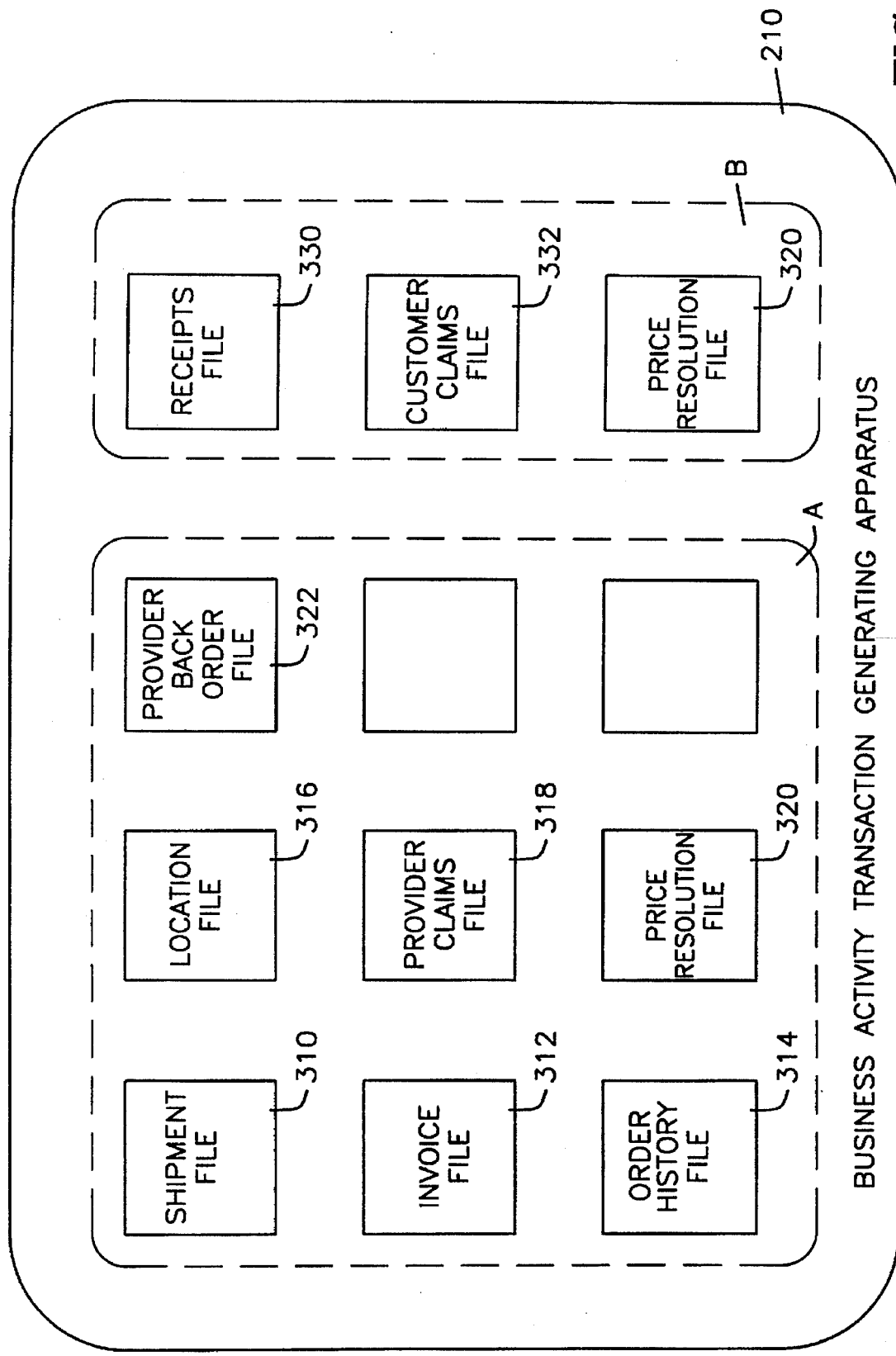
FIG. 3 is a schematic block diagram depicting an allocation of memory files within a business activity transaction generating apparatus of the present invention.

FIG. 3 is a schematic block diagram depicting a number of databases that are preferably included in a transaction generator 210 for contemplated system operation. These same databases may very well be included in the business controller when it operates as control process point. A separation formed by the broken line shown in FIG. 3 defines a boundary related to the updatability of the several databases. The two sets of databases are designated as A and B.

The A-designated databases are updatable only by the business controller 120 (or manufacturer computer in the embodiment of FIG. 1) located at the manufacturer location. The shipment file 310, the invoice file 312, the order history file 314, the manufacturer claims file 318, the location file 316, the price resolution file 320 and the back order file 322. The A-designated databases may be accessed by the entire system. The business controller 120 and transaction generator 210 may be interfaced via electronic communication link 140. The B-designated databases, i.e., receipts file 330, the customer claims file 332, and the price disputes file 334, are updatable by the transaction generator 210 itself, and/or the receiver network computer 130 but accessible by the entire system.

Both the business controller 120 and the transaction generator 210 may include keyboards 124 and 214, respectively, and video display terminals 122 and 212, respectively. Users at either the manufacturer or distributor locations can use the keyboards and video display terminals to provide information to (i.e., keyboard input) and receive display information (i.e., display) from the system.

Operation of the present system 200 will now be described with the reference to FIGS. 2 and 3. The receiver (distributor) network computer 130 provides electronic business transaction information to the transaction generator 210 (information collection phase). In addition, the transaction generator 210 receives information from the business controller 120 (information collection phase). The electronic information is stored in any of the above-described databases where it is accessible to the receiver network computer 130 and to the business controller 120. All information available to the business controller 120 is concomitantly available to the manufacturer computer 110.

Upon receipt of business activity, the transaction generator 210 processes the information and may generate a business transaction activity. Each time a business transaction is generated, it is sent from the transaction generator 210 to both the receiver (distributor) computer 130 and to the business controller 120, which in turn relays the transaction activity information to the manufacturer computer 110.

In a more detailed example of this process, the distributor's computer 130 may transmit inventory level activity to the transaction generator 210, which in turn relays the information electronically to the business controller 120. The information may be processed at the business controller and an order may be generated thereat in the form of a notification sent to the transaction generator 210. In response, the transaction generator creates a business transaction and sends the transaction information to both the receiver (distributor) computer 130 and the manufacturer computer 110 via the business controller 120.

After actually processing the order and shipping the goods to the distributor, the manufacturer computer 110 sends shipping activity information to the transaction generator 210 via the business controller 120. The information creates an Advanced Shipment Advisory which is sent to both the manufacturer computer 110 via the business controller 120, and the distributor computer 130. Upon receipt of the goods shipment, the distributor computer 130 sends activity information to the transaction generator 210, which in response sends receipt acknowledgement and billing effect transactions to both the receiver (distributor) and the manufacturer computers via the business controller.

If a claim associated with the shipment requires processing, such as a claim for damaged goods, shortage or overage, or any other normal business exception, the claims activity is sent from the receiver computer 130 to the transaction generator 210. The transaction generator processes the information and generates an appropriate business transaction, which is sent to both the receiver computer 130 and the manufacturer computer 110 via the business controller 120.

The essence of this invention resides in the system's ability to replace as much paper work and human processing associated with the processing of exceptions (claims, discrepancies, etc.) as possible with related technology. In addition, this invention provides for the immediate billing effect of all business transactions occurring at both the manufacturer and the receiver (distributor) locations. For example, as a shipment claim is processed, the transaction generator 210 generates an associated business transaction and immediately notifies both the manufacturer computer 110 and the receiver (distributor) computer 130 as to the billing effect of the transaction.

Figure 4:
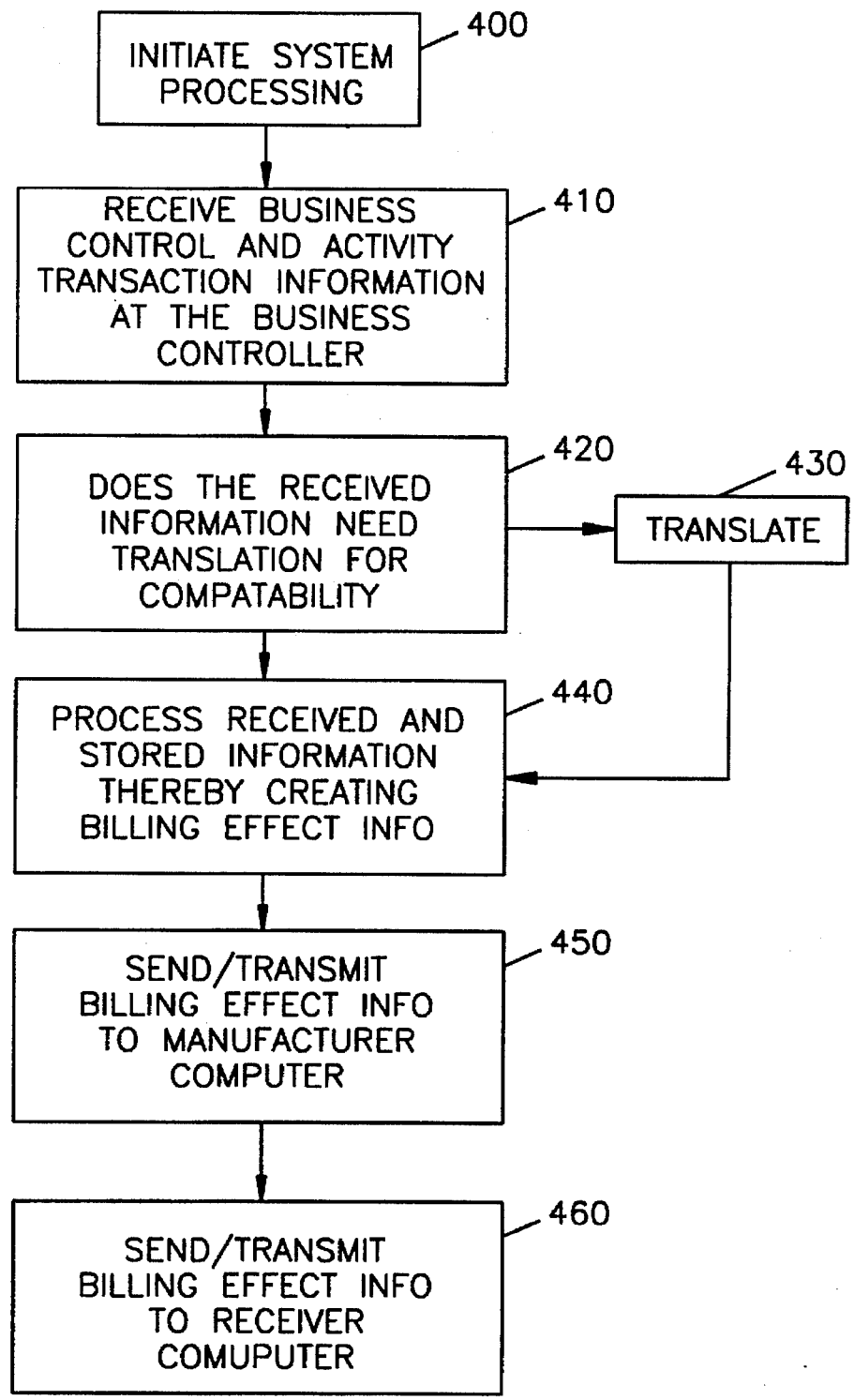
FIG. 4 is a schematic flow diagram depicting the electronic method of controlling and tracking information related to business transactions and sharing information related thereto.

FIG. 4 is a schematic flow diagram depicting a method of operation of one embodiment of the electronic system of this invention. The method provides for automatic control and adjustment of billing and inventory information in accordance with stored electronic information relating to a business transaction (information collection phase). Both a manufacturer and distributor may thereby access the electronic information and track all shipment progress, responding automatically to any status changes. Put another way, all business control and transaction information is available in a shared database accessible by both the provider and receiver of goods.

Block 400 of FIG. 4 represents a step of initiating the method provided herein for the embodiment of FIG. 1. This step may vary with the needs of the system. For example, there may be a regularly timed update or transfer of information from either the manufacturer or receiver computers, or, the billing controller (or transaction generator) may initiate an electronic transfer of business information.

Block 410 identifies a step of receiving business control and activity transaction information (i.e., electronic information) at the business controller 120 (information collection phase). In the embodiment depicted in FIG. 2 and described above, the received information may be received from a receiver network computer 130 located at a distributor location, or from a transaction generator 210 located at the distributor location. The electronic information may be identified with and correlated to an existing electronic order, whether or not the information is in a conventionally available data format. For example, the information may be transmitted in EDI, ASCII, or EBCDIC formats.

Block 420 identifies a step in which a check is made by the business controller 120 (or the transaction generator) to identify the format of information received. If the electronic transaction information is provided in EDI format, the information must be translated. Accordingly, the step represented as block 430 must be performed on the electronic information. The data structure of the information is adjusted for compatibility. Such adjustment may include removing particular control characters utilized for the transmission of the electronic invoice via an EDI-based network (information collection phase).

Block 440 describes a step in which the business controller 120 processes the received electronic business control and transaction activity information together with the existing stored electronic information. As a result of the electronic information processing, an electronic order may be generated and transmitted to the manufacturer computer. The electronic order (information) may be generated in any manner known to those skilled in the art as long as a data structure defining the invoice is compatible for processing within the manufacturer network computer.

Block 450 represents the step of transmitting the generated business transaction (which may be referred to as a billing effect or audit transaction) over electronic communication link 140 or by direct connection to the manufacturer computer 110. Block 460 represents the step of transmitting the exact copy of the business transaction, generated in Block 440, and sent in Block 450, over electronic communication link 140 or by direct connection to receiver computer 130.

Figure 5:
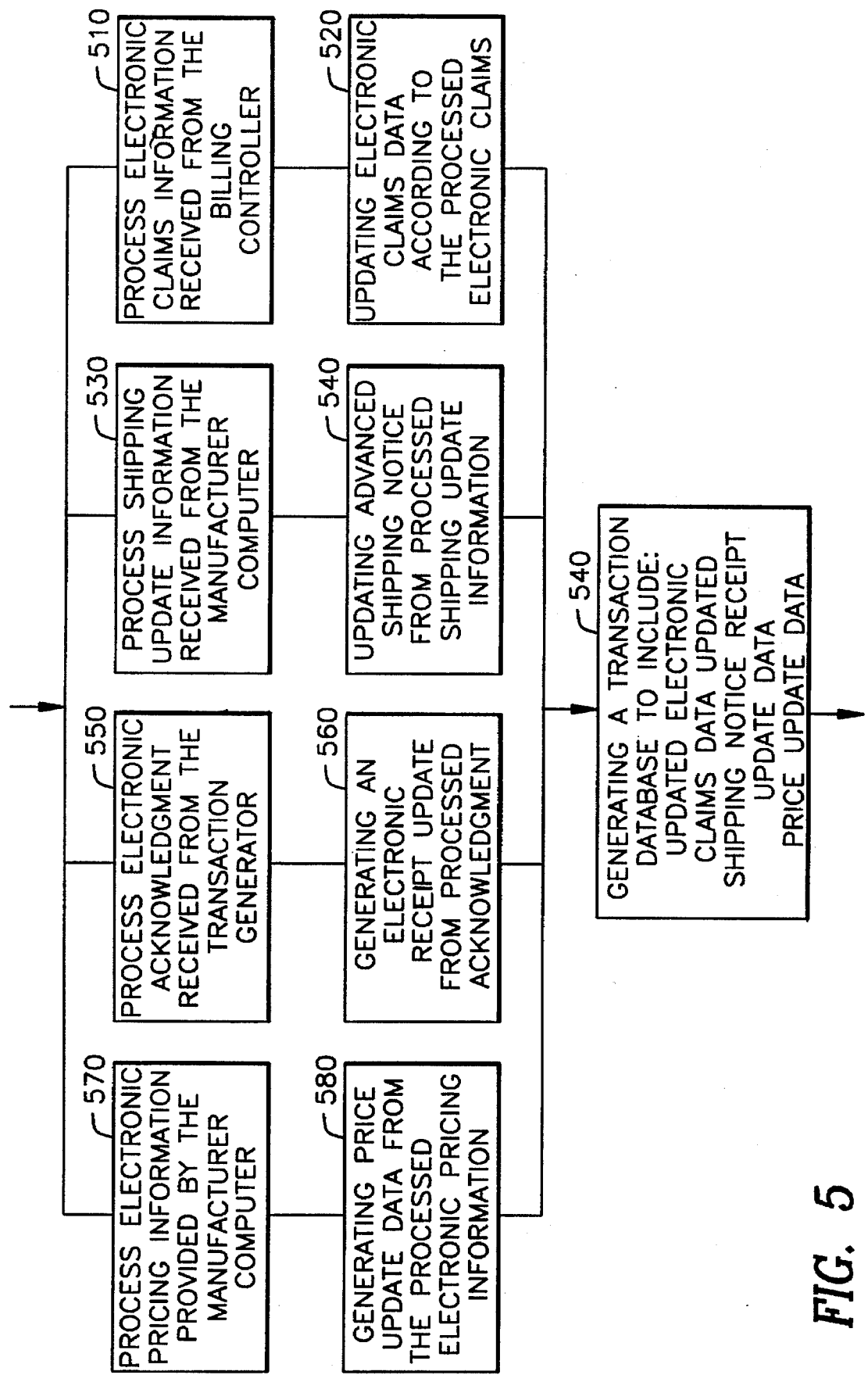
FIG. 5 is a schematic flow diagram depicting in greater detail one of the blocks shown in FIG. 4.

FIG. 5 is a more detailed schematic flow diagram of block 440 of FIG. 4, representing the steps of processing the received and stored business data and transaction information (i.e., the electronic information). Block 510 represents the step of processing electronic claims information (exception data) received at the transaction generator 210 from the receiver (distributor) computer 130 or entered normally via keyboard 214. There, any discrepancies between order amounts, pricing, damaged goods, overage, underage, etc., are assessed and processed and transferred to the business controller 120.

Block 520 represents the step of updating electronics claims data according to the processed electronic claims information (business transaction phase). If acceptable to the system defined criteria, the updated electronic claims data are then incorporated within the electronic information available to the system.

Block 530 includes the step of processing electronic shipping update information received from the manufacturer network computer 110 (information collection phase). Block 540 represents the step of updating the electronic shipping notice to provide an updated shipping notice therefrom. The updated shipping notice is incorporated into an appropriate database for access by the system.

Block 550 includes the step of receiving and processing an electronic acknowledgment provided by the receiver network computer 130. The electronic acknowledgement is generated in response to the updated shipping notice transmitted to the receiver network computer. Block 560 represents the step of generating an electronic receipt update according to the electronic acknowledgement. The electronic receipt update data is also incorporated into the appropriate database and made available to both the receiver and manufacturer computers.

Block 570 represents the step of receiving and processing electronic pricing information (in the form of price update data) transmitted by the manufacturer computer 110 via the business controller 120. The price update data may then be incorporated into the appropriate database and made available to both the manufacturer and distributor computers. Block 580 represents the step of generating the price update (business transaction) information to be sent to both the manufacturer computer 110 and the receiver computer 130. This process assures that price remains synchronized between the manufacturer and the distributor.

Block 590 depicts a step of inputting the above-described information into common database files to be accessed by both the manufacturer and the receiver (distributor) computers. The database files will contain all business transactions (information) sent to both the manufacturer and receiver. Consequently, all systems will be synchronized. These transactions will include business transactions such as order acknowledgements, advanced shipping notices, receipt acknowledgments, billing effect transactions, claim transactions, along with many more business activities.

Figure 6:
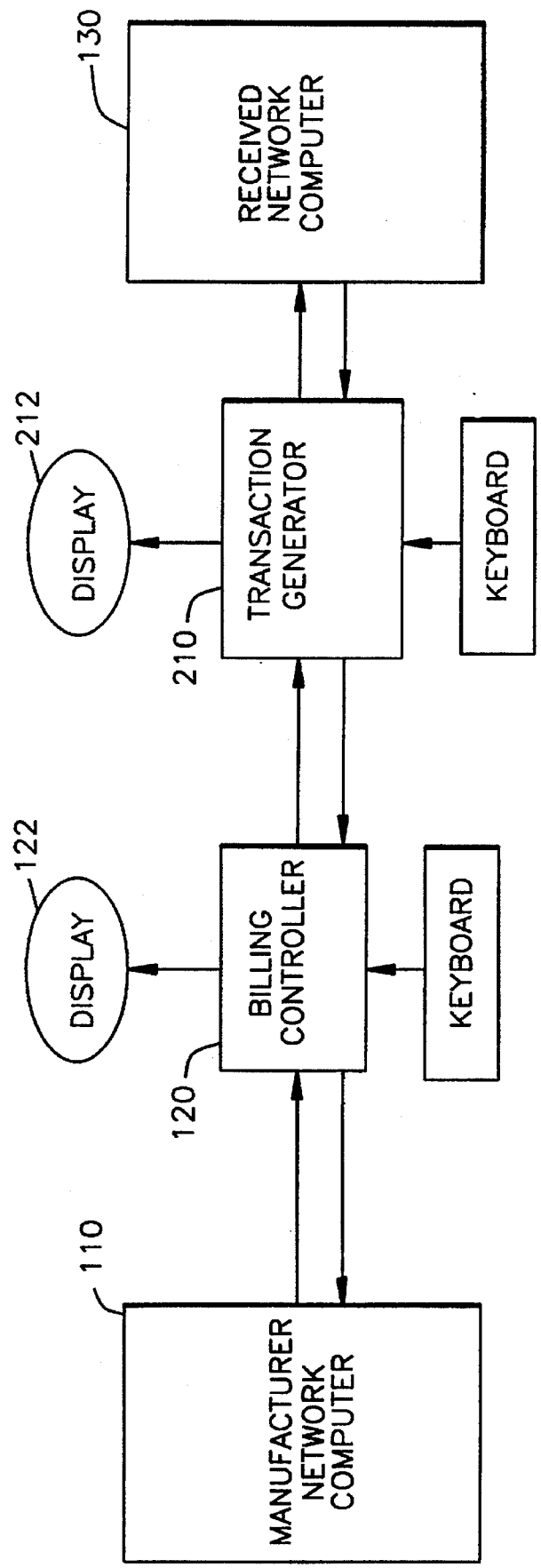
FIG. 6 is a schematic block diagram depicting signal interaction within the embodiment of the present invention shown in FIG. 2.

FIG. 6 is a schematic block diagram used to show electronic signal interaction between a manufacturer computer 110 and a business controller 120, between the business controller and a transaction generator via electronic link 140, and between transaction generator 210 and receiver network computer 130. As is clearly seen by FIG. 6, electronic signals driven by different parts of this system may be shared with all other parts of the system to control business transacted on the system by either the business controller or transaction generator.

Various changes to the foregoing described and shown structures would now be evident to those skilled in the art.

For example, this disclosure describes the business controller (control process point) of this invention as being located at either a provider or receiver (distributor) location. The business controller (control process point) is not limited to the described locations, however, but may be located at a location that is independent of the provider and receiver locations. Accordingly, the particularly disclosed scope of the invention is set forth in the following claims.

What is claimed is:

1. A method for automatically controlling and tracking inventory level activity between a manufacturer and a distributor, comprising the steps of:
   a) providing
      i) a manufacturer computer located at a manufacturer location capable of exchanging business transaction information;
      ii) a distributor computer located at a destination for said manufacturer's goods, said distributor computer capable of exchanging business transaction information;
      iii) a business controller in electrical communication with said manufacturer computer and said distributor computer; and
      iv) a transaction generator in electrical communication with said distributor computer and said business controller;
   b) transmitting inventory level activity information from said distributor computer to said transaction generator and thereafter to said business controller;
   c) processing of said information by said business controller to generate an order and thereafter transmitting a notification to said transaction generator;
   d) transmitting of a business transaction by said transaction generator to both said distributor and manufacturer computers;
   e) transmitting shipping activity information by said manufacturer computer to said transaction generator following processing and shipping of goods to said distributor;
   f) transmitting an advanced shipment advisory by said transaction generator to both said distributor and manufacturer computers;
   g) transmitting receipt activity information by said distributor computer to said transaction generator following receipt of said goods; and
   h) transmitting receipt acknowledgment and billing effect transactions by said transaction generator to both said distributor and manufacturer computers.

2. The method according to claim 1, further comprising the step of transmitting claims activity information by said distributor computer to said transaction generator and thereafter transmitting said claims activity information by said transaction generator to both said manufacturer and distributor computers.

3. The method according to claim 1, wherein said steps of transmitting by said transaction generator to said manufacturer and distributor computers are accomplished substantially simultaneously.

4. The method according to claim 1, wherein said transmissions between said transaction generator and said manufacturer computer are effected via said business controller.

5. The method according to claim 1, wherein said business controller is located at said manufacturer.

6. The method according to claim 1, wherein said transaction generator is located at said distributor.

* * * * *